US010878124B1

(12) United States Patent
Sitaraman et al.

(10) Patent No.: US 10,878,124 B1
(45) Date of Patent: Dec. 29, 2020

(54) SYSTEMS AND METHODS FOR DETECTING SENSITIVE INFORMATION USING PATTERN RECOGNITION

(71) Applicant: DATAGUISE, INC., Fremont, CA (US)

(72) Inventors: Vilayannur Ramachandran Sitaraman, Fremont, CA (US); Rocky Harry W. Nevin, III, Berkeley, CA (US); Subramanian Ramesh, Fremont, CA (US)

(73) Assignee: Dataguise, Inc., Fremont, CA (US)

( * ) Notice: Subject to any disclaimer, the term of this patent is extended or adjusted under 35 U.S.C. 154(b) by 126 days.

(21) Appl. No.: 16/211,148

(22) Filed: Dec. 5, 2018

Related U.S. Application Data

(60) Provisional application No. 62/595,443, filed on Dec. 6, 2017.

(51) Int. Cl.
*G06F 17/21* (2006.01)
*G06F 17/24* (2006.01)
*G06F 21/62* (2013.01)
*G06N 5/04* (2006.01)
*G06N 20/10* (2019.01)

(52) U.S. Cl.
CPC ......... *G06F 21/6245* (2013.01); *G06N 5/047* (2013.01); *G06N 20/10* (2019.01)

(58) Field of Classification Search
CPC ............. G06F 17/243; G06F 17/30616; G06F 17/2715; G06F 17/218
USPC .................................. 726/22, 23, 24, 25, 26
See application file for complete search history.

(56) References Cited

U.S. PATENT DOCUMENTS

| | | | |
|---|---|---|---|
| 10,747,797 B2 * | 8/2020 | Carmi | G06F 16/335 |
| 2006/0123000 A1 * | 6/2006 | Baxter | G06F 16/86 |
| 2008/0263451 A1 * | 10/2008 | Portele | G10L 15/22 |
| | | | 715/727 |

(Continued)

OTHER PUBLICATIONS

"Sharing Sensitive Data with Confidence: The Datatags System"—Bar-Sinai et al, Technology Science, Oct. 16, 2015 https://scholar.harvard.edu/files/mercecrosas/files/techsci-datatags-sweeneycrosasbarsinai.pdf (Year: 2015).*

*Primary Examiner* — Randy A Scott
(74) *Attorney, Agent, or Firm* — McDermott Will & Emery LLP

(57) ABSTRACT

Methods and systems for identifying sensitive information are provided. The method includes tokenizing labeled data into first word sequences, the labeled data including sensitive information. The method includes associating the labeled sensitive information with tags. The method includes determining that the first word sequences and the tags satisfy conditions defined by feature functions. The method includes calculating a local maximum of a likelihood function to determine a weight. The method includes tokenizing unlabeled data into second word sequences, the unlabeled data including sensitive information. The method includes executing each feature function based on their weights, the second word sequences, and tag sequences. The method includes selecting tag sequences that maximize probabilities of the second word sequences based on the likelihood function. The method includes identifying sensitive information in the unlabeled data based on the selected tag sequences.

20 Claims, 14 Drawing Sheets

(56) References Cited

U.S. PATENT DOCUMENTS

2010/0076957 A1* 3/2010 Staddon ............... G06F 16/313
                                                    707/722
2018/0197531 A1* 7/2018 Baughman ........... G06F 40/242

* cited by examiner

300

Example PseudoCode for Statically Defined Feature Function for a CreditCardNumber Sensitive Type

```
If input.tag for CurrentWord is CCN
    Define the Regex for CCN
    Check if the word matches the Regex for CCN
    If the word matches the regex for CCN
        Check if the luhns condition is satisfied for the word
        If the luhns condition matches
            Check if in a window of 4 words from the current word the word CCN occurs
            If in a window of 4 words the word CCN occurs
                return 1.0
            else
                return 0.0
        else
            return 0.0
    else
        return 0.0
else
    return 0.0
```

Example Pseudocode for a dynamically generated Feature Function for SSN

FeatureFunctionSSN Constructor parameters: contextWords, contextWindow
Check if Tag for current word is SSN
If Tag for current word is SSN
    Check if the current word matches the Regex for SSN
    If the current word matches the Regex for SSN
        Check if any one of the context words occurs within the context window of the current word
        If the context words occur within the context window of the current word
            return 1.0
        else
            return 0.0
    else
        return 0.0
else
    return 0.0

| CONFIGURABLE PARAMETERS | |
|---|---|
| TRAINING/INFERENCE FILE LOCATIONS | |
| Training File Location | Textbox |
| Limit Number of Training Records | Integer Greyed Out if Checkbox Unchecked |
| Training Output Parameters Location | Textbox |
| Run Inference from File | Checkbox |
| Inference Input File Location | Greyed Out if Above is not Checked |
| Inference Output File Location | Textbox |
| Feature Function Persist Location | Textbox |
| DISCRIMINANT RELATED PARAMETERS | |
| Discriminant Detection Mode | Dropdown (Unigram, N-Gram) |
| Discriminant Strength Threshold | Double Value |
| Max Discriminants without Threshold | Integer Value |
| Support Custom Validations | Checkbox |

Example of training phase output

For sensitiveType CreditCardNumber
correlated words are [credit]                    MI: 0.0255 Zvalue: 0.8224
correlated words are [number]                    MI: 0.0172 Zvalue: 0.8145
correlated words are [cvv]                       MI: 0.1907 Zvalue: 0.9796
correlated words are [card]                      MI: 0.1885 Zvalue: 0.9775
correlated words are [visa]                      MI: 0.1940 Zvalue: 0.9827
correlated words are [cvv, number]               MI: 0.1907 Zvalue: 0.9796
correlated words are [credit, visa]              MI: 0.1940 Zvalue: 0.9827
correlated words are [card, credit]              MI: 0.1885 Zvalue: 0.9775
correlated words are [number, visa]              MI: 0.1940 Zvalue: 0.9827
correlated words are [number, visa, credit]      MI: 0.1940 Zvalue: 0.9827
correlated words are [number, credit]            MI: 0.1940 Zvalue: 0.9827

PER-SENSITIVE TYPE DISCRIMINANT DETECTION PARAMETERS

| | |
|---|---|
| SENSITIVE TYPE | TEXT BOX CONTAINING SENSITIVE TYPE NAME |
| DISCRIMINANT DETECTION MODE | DROPDOWN (UNIGRAM, N-GRAM) |
| DISCRIMINANT STRENGTH THRESHOLD | DOUBLE VALUE |
| MAX DISCRIMINANTS WITHOUT THRESHOLD | INTEGER VALUE |
| SENSITIVE TYPE | TEXT BOX CONTAINING SENSITIVE TYPE NAME |
| DISCRIMINANT DETECTION MODE | DROPDOWN (UNIGRAM, N-GRAM) |
| DISCRIMINANT STRENGTH THRESHOLD | DOUBLE VALUE |
| MAX DISCRIMINANTS WITHOUT THRESHOLD | INTEGER VALUE |

+ ADD SENSITIVE TYPE      − DELETE SENSITIVE TYPES

Example of results output after detection

| Sensitive type | Vanilla detection count | Context aware count |
|---|---|---|
| CreditCardNumber | 234 | 312 |
| SocialSecurityNumber | 539 | 456 |
| ABARoutingNumber | 1035 | 865 |

FIG. 12

SYSTEMS AND METHODS FOR DETECTING SENSITIVE INFORMATION USING PATTERN RECOGNITION

CROSS-REFERENCE TO RELATED APPLICATION

The present application claims the benefit of priority under 35 U.S.C. § 119 from U.S. Provisional Patent Application Ser. No. 62/595,443 entitled "SYSTEMS AND METHODS FOR DETECTING SENSITIVE INFORMATION USING PATTERN RECOGNITION," filed on Dec. 6, 2017, the disclosure of which is hereby incorporated by reference in its entirety for all purposes.

TECHNICAL FIELD

The present disclosure generally relates to systems and methods for information detection and data security, and more specifically relates to detection of sensitive items using a pattern recognition approach to learn the patterns occurring in the context of a candidate sensitive item in a data record.

BACKGROUND

Securing sensitive information is an important concern for any organization or enterprise. Compromised security scenarios include hacking, stealing, and public exposure of personal information and private sensitive data of millions of user accounts. Often, sensitive information is buried within a huge volume of data. A prerequisite to securing the sensitive data is the detection of the sensitive items. Adequate manual detection is infeasible due to the large volume of data. Therefore, there is a need for improved techniques for detecting and securing sensitive information.

SUMMARY

The present disclosure provides for systems and methods for identifying sensitive information. According to aspects of the present disclosure, a computer-implemented method is provided. The method includes tokenizing labeled data into a first set of word sequences, the labeled data including labeled sensitive information. The method also includes associating the labeled sensitive information with tags. The method also includes determining that the first set of word sequences and the tags satisfy conditions defined by feature functions. The method also includes determining a weight of each feature function by calculating a local maximum of a likelihood function based on the labeled data. The method also includes tokenizing unlabeled data into a second set of word sequences, the unlabeled data comprising unlabeled sensitive information. The method also includes executing each feature function based on their weights with the second set of word sequences and tag sequences as inputs. The method also includes selecting the tag sequences that maximize probabilities of the second set of word sequences based on the likelihood function. The method also includes identifying the sensitive information in the unlabeled data based on the selected tag sequences.

According to aspects of the present disclosure, a system is provided that includes means for storing instructions, and means for executing the stored instructions that, when executed by the means, cause the means to perform a method. The method includes tokenizing labeled data into a first set of word sequences, the labeled data including labeled sensitive information. The method also includes associating the sensitive information with tags. The method also includes determining that the first set of word sequences and the tags satisfy conditions defined by feature functions. The method also includes determining a weight of each feature function by calculating a local maximum of a likelihood function based on the labeled data. The method also includes tokenizing unlabeled data into a second set of word sequences, the unlabeled data comprising unlabeled sensitive information. The method also includes executing each feature function based on their weights with the second set of word sequences and tag sequences as inputs. The method also includes selecting the tag sequences that maximize probabilities of the second set of word sequences based on the likelihood function. The method also includes identifying the sensitive information in the unlabeled data based on the selected tag sequences.

According to aspects of the present disclosure, a system is provided for identifying sensitive information including a memory storing sequences of instructions, and a processor configured to execute the sequences of instructions, which when executed, causes the processor to perform tokenizing labeled data into a first set of word sequences, the labeled data including labeled sensitive information. The execution of the sequences of instructions also causes the processor to perform associating the labeled sensitive information with tags. The execution of the sequences of instructions also causes the processor to perform determining that the first set of word sequences and the tags satisfy conditions defined by feature functions. The execution of the sequences of instructions also causes the processor to perform determining a weight of each feature function by calculating a local maximum of a likelihood function based on the labeled data. The execution of the sequences of instructions also causes the processor to perform tokenizing unlabeled data into a second set of word sequences, the unlabeled data comprising unlabeled sensitive information. The execution of the sequences of instructions also causes the processor to perform executing each feature function based on their weights with the second set of word sequences and tag sequences as inputs. The execution of the sequences of instructions also causes the processor to perform selecting the tag sequences that maximize probabilities of the second set of word sequences based on the likelihood function. The execution of the sequences of instructions also causes the processor to perform identifying the sensitive information in the unlabeled data based on the selected tag sequences.

According to aspects of the present disclosure, a non-transitory computer readable storage medium is provided including instructions that, when executed by a processor, cause the processor to perform a method for identifying sensitive information. The method includes tokenizing labeled data into a first set of word sequences, the labeled data comprising labeled sensitive information. The method also includes associating the labeled sensitive information with tags. The method also includes determining that the first set of word sequences and the tags satisfy conditions defined by feature functions. The method also includes determining a weight of each feature function by calculating a local maximum of each feature function based on the labeled data. The method also includes tokenizing unlabeled data into a second set of word sequences, the unlabeled data comprising unlabeled sensitive information. The method also includes executing each feature function based on their weights with the second set of word sequences and the tags as inputs. The method also includes selecting the tags that maximize probabilities of the second set of word sequences based on the executing. The method also includes identifying the sensitive information in the unlabeled data based on the selecting.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate aspects of the subject technology, and together with the description serve to explain the principles of the subject technology. In the drawings:

FIG. 3 illustrates an example pseudocode of a statically defined feature function, according to certain aspects of the disclosure.

FIG. 4 illustrates an example pseudocode of a dynamically generated feature function, according to certain aspects of the disclosure.

FIG. 9 illustrates an example user interface, according to certain aspects of the disclosure.

FIG. 10 illustrates example training phase output, according to certain aspects of the disclosure.

FIG. 11 illustrates an example user interface, according to certain aspects of the disclosure.

FIG. 12 illustrates example detection output data, according to certain aspects of the disclosure.

Figure 1:
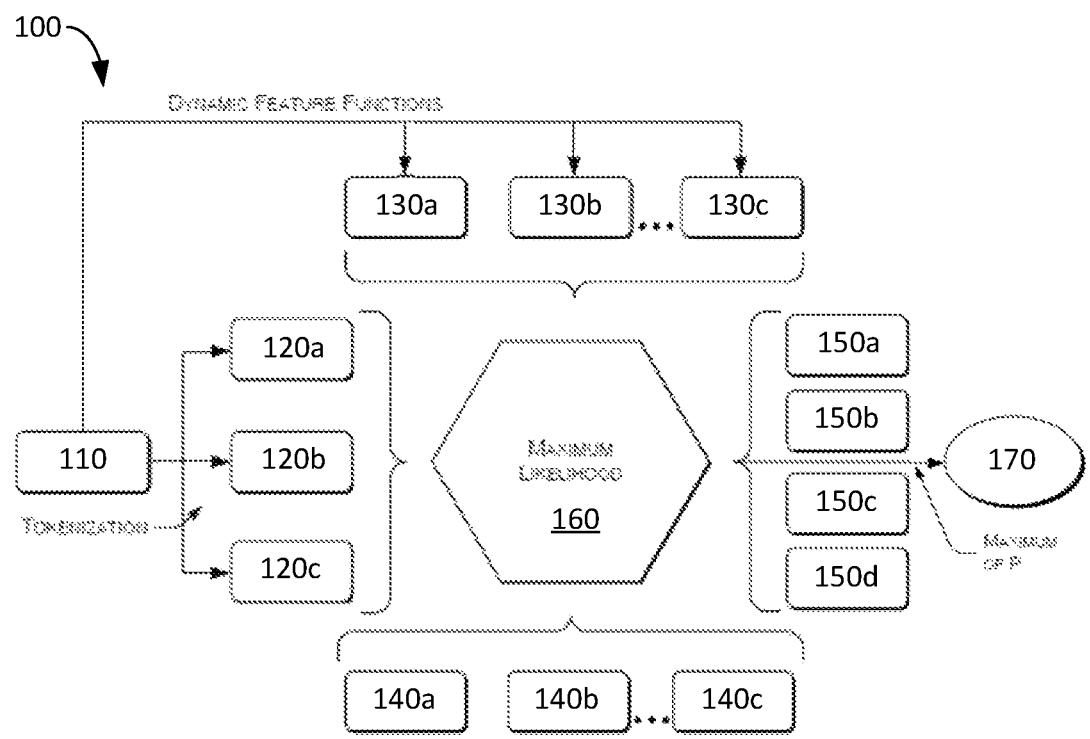
FIG. 1 illustrates an example training phase of a system for identifying sensitive information, according to certain aspects of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

Securing sensitive information is an important concern for any organization or enterprise. Compromised security scenarios include hacking, stealing, and public exposure of personal information and private sensitive data of millions of user accounts. Often, sensitive information is buried within a huge volume of data. A prerequisite to securing the sensitive data is the detection of the sensitive items. Adequate manual detection is infeasible due to the large volume data.

Conventional static rules-based detection are an improvement over manual detection because the detection is automated for patterns that are known beforehand. However, similar to the shortcomings of a manual detection scheme, a rules-based system can overlook patterns that are present in the data. Moreover, in big data scenarios the velocity and variety of data means that it is difficult to capture all the patterns as rules upfront. Strict conformance regulations do not allow for a static set of rules alone to aid in the detection of sensitive items in the data.

Therefore, there is a need for systems and methods that enable learning patterns in the data continuously during production by labelling data sets without being cognizant of patterns in the data and with minimum interaction from a user. There is also a need for systems that can identify potential discriminants for sensitive types, which can then be used as inputs in a learning phase to automatically identify patterns in training data followed by detection of sensitive types in test data.

The disclosed systems and methods address a problem in traditional data security techniques tied to computer technology, namely, the technical problem of identifying sensitive information in large volumes of data. The disclosed systems and methods solve this technical problem by providing a solution also rooted in computer technology, namely, by training feature functions and utilizing the trained feature functions to identify sensitive information. The disclosed systems and methods also combine correlation measures with dynamically generated feature functions for identification of discriminants. The disclosed subject technology further provides improvements to the functioning of the computer itself because it reduces processing time and reduces the cost of system resources.

Example System Architecture for Identifying Sensitive Information

Aspects of the present disclosure describe systems and methods for detecting sensitive information using pattern recognition. An example system can apply machine learning techniques to the problem of automatic detection of sensitive types, within large volumes of data, while making use of automatically learned patterns that exist in data. The example system can perform automatic detection of discriminating data (e.g., discriminants) in a context of sensitive types, which can then be processed by machine learning techniques for further accuracy. The detected discriminating data can then be utilized for security purposes.

FIG. 1 illustrates an example training phase of a system 100 for identifying sensitive information, according to certain aspects of the disclosure. The system 100 receives as input labeled data 110 that includes sensitive information. For example, the labeled data 110 can be training data that is generated by marking up documents to identify the sensitive information in the documents. According to an aspect, the labeled data 110 includes tags 140a, 140b, and 140c. For example, the labeled sensitive information can be associated with the tags 140, each tag 140 corresponding to a type of the labeled sensitive information. In an implementation, each tag 140 can correspond to a different type of sensitive type, such as credit card number (CCN), social security number (SSN), bank account information (e.g., ABA routing number), etc. It is understood that other types of sensitive information can be included as a tag 140, and it is further understood that more than three tags 140 can be included in the labeled data 110.

According to aspects, the labeled data 110 is tokenized into word sequences 120a, 120b, and 120c (e.g., a first set of word sequences). For example, each word sequence 120 can include multiple words, or can include only a single word. The word sequences 120a, 120b, and 120c can be tokenized in order of appearance in the labeled data 110. It is understood that more than three word sequences 120 can be tokenized from the labeled data 110. The tags 140a, 140b, and 140c are read into the system 100 and all possible tags 150a, 150b, 150c, and 150d are generated. For example, each tag sequence 140 can include various combinations of the tags 150a, 150b, 150c, and 150d in various orders. It is understood that although four tag sequences 150 are illustrated, the system 100 can include more than four tag sequences 150.

Based on the labeled data 110, some feature functions 130 (e.g., a set of patterns or conditions) are defined. For example, feature function 130a can be statically defined beforehand (e.g., a set of static feature functions), and feature functions 130b and 130c can be dynamically defined (a set of dynamic feature functions) based on the labeled data 110. The dynamically defined feature functions 130b and 130c can be dynamically created based on a context of labeled sensitive types (e.g., the tags 140) in the labeled data 110, which can include regular expressions (i.e., regexes) for those sensitive types. For example, a regex can be a sequence of characters that define a search pattern. According to an aspect, the feature functions 130 can be dynamically defined by learning correlations between the word sequences 120 and the tags 140, and defining a set of patterns of conditions based on the learned correlations. It is understood that although three feature functions 130 are illustrated, the system 100 can include more than three feature functions 130.

According to an aspect, the feature functions 130 are called and executed in a sequence. It is determined that the word sequences 120, the tags 140, and/or 150 tag sequences, satisfy conditions defined by the feature functions 130. For example, calculated weights using a maximum likelihood function (e.g., a log linear model) capture the applicability of the conditions defined in the feature functions to the input records (e.g., training data). The weights can be negative, zero, or positive. Zero implies that the sensitive type corresponding to the feature function do not appear in the input records. Negative indicates that the conditions captured by the feature functions are not applicable to the input records. Positive implies that the conditions are applicable to the input records. The magnitude of the weight indicates the extent of the applicability to the input records. In an implementation, inputs to each feature function 130 is the entire record under consideration (e.g., word sequences 120 and/or tag sequences 150), the tag of the word under consideration (e.g., tag 140b), and/or the tag of the word previous to the word under consideration (e.g., tag 140a).

The feature functions 130 can be configured to return a non-zero, positive, double value if conditions (e.g., patterns) encoded by the feature functions 130 are satisfied by the input word (e.g., tags 140) and tag sequence 150. A maximization of a probability function 160 is carried out using gradient ascent with weights of each feature function 130 as an optimization parameter. The gradient ascent algorithms return the weights 170 for each feature function 130, which maximize a probability (P) of the tags 140 out of all possible tag sequences 150. For example, the weight 170 of each feature function 130 can be determined by calculating a local maximum of each feature function 130 based on the labeled data 110. For example, the weights 170 are learned dynamically. The weights 170 are then used for an inference phase, as described below in FIG. 2.

According to an aspect, any given feature function 230 looks at one or more possible tag values (e.g., tags 140) for a current input word (e.g., word sequence 120) under consideration. During the training phase, if the patterns encoded by the feature function 130 do not match what is provided with the input, then the weights 170 learned are negative. If the tags 140 do not match, then the weights 170 learned are zero. Therefore, the training set (e.g., labeled data 110) determines which feature functions 130, and therefore which patterns, dominate in the test sets via the weights 170 learned using the training set. For example, the feature functions 130 can link the pattern with the sensitive type. This enables a computer to probabilistically determine which sensitive type is present depending on which patterns are detected via the feature functions 130. According to a further aspect, a superset of feature functions 130 can be used in the training phase and, depending on the training set, an appropriately relevant subset of feature functions can be learned.

Figure 2:
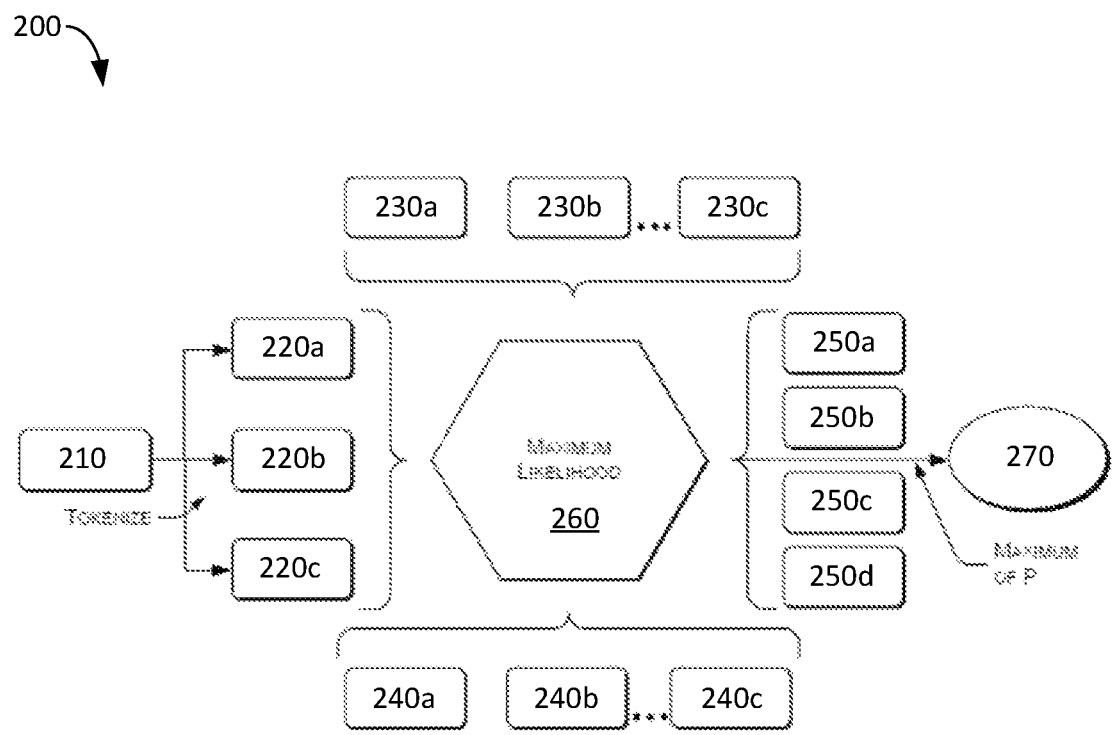
FIG. 2 illustrates an example inference phase of a system for identifying sensitive information, according to certain aspects of the disclosure.

FIG. 2 illustrates an example inference phase of a system 200 for identifying sensitive information, according to certain aspects of the disclosure. The inference phase comes after the training phase described above in FIG. 1. According to aspects, unlabeled data 210 (e.g., test data) is tokenized into word sequences 220a, 220b, and 220c (e.g., a second set of word sequences). The unlabeled data 210 can include unlabeled sensitive information. For example, each word sequence 220 can include multiple words, or can include only a single word. The word sequences 220a, 220b, and 220c can be tokenized in order of appearance in the unlabeled data 210. It is understood that more than three word sequences 220 can be tokenized from the unlabeled data 210. Each tag sequence 140 can include various combinations from a set of all possible tags 250a, 250b, 250c, and 250d in various orders. It is understood that although four tag sequences 250 are illustrated, the system 200 can include more than four tag sequences 250.

The system 200 also includes feature functions 230a, 230b, and 230c. For example, the feature functions 230 can be defined beforehand (e.g., statically) or can be defined based on the training phase in FIG. 1 (e.g., dynamically). In an implementation, the feature functions 230a, 230b, and 230*c* can be the same as feature functions 130*a*, 130*b*, and 130*c* in FIG. 1. It is understood that although three feature functions 230 are illustrated, the system 200 can include more than three feature functions 230.

According to an aspect of the present disclosure, all the feature functions 230 are executed with their input consisting of the entire tokenized input word sequence (e.g., word sequences 220), the previous candidate tags (e.g., tags 140), and also the current word candidate tag. In an implementation, the feature functions 230 can be executed based on their corresponding weights 240*a*, 240*b*, and 240*c*. For example, the weights 240 can be determined in the training phase of FIG. 1. The feature functions 230 are executed for all possible tag sequences 250 to choose a specific tag sequence 250. For example, a tag sequence 250 is chosen by a probability function 260 that maximizes a probability (P) of the input sequence (e.g., unlabeled data 210). A subset of the tag sequence 250 indicates sensitive types of the corresponding input word sequence. For example, identified sensitive information 270 can be output based on the results of the probability function 260.

In an implementation, an example system applies Conditional Random Fields (CRFs) modeling, structured Support Vector Machine (struct-SVM) techniques, or application programming interfaces (APIs) with dynamically generated feature functions for pattern recognition and machine learning, in order to make multivariate and/or structured predictions. The patterns learned are associated with the presence of discriminating context words and combinations that have a high correlation to the presence of sensitive types. Learned patterns can then be applied to new data, wherein in the event of a pattern match, the data fields are ascribed a sensitive type using the dynamically generated feature functions. Data fields assigned a sensitive type by the system can then be used to update a database (e.g., data storage).

According to aspects, user interface hardware allows a user to access the sensitive data, secure the data, and/or search the data in the context of information or fields marked as sensitive. For example, the system can return results of a query for sensitive data to the display hardware. The user interface hardware can also allow a user to select security and/or encryption options regarding sensitive data and/or sensitive fields. In an implementation, the example system continues learning new patterns that contain sensitive data types as new data while potentially unknown structures are entered into the system, or otherwise presented to the system for storage. System hardware may alert the user to the detection of new sensitive data or new sensitive data fields.

In an implementation, an example system applies Conditional Random Fields (CRF), which is a special case of log-linear models that are a powerful generalization of logistic regression. For example, a probability distribution includes the tag sequences of labels on arbitrary strings. A tag can be the characterization of a single word. Characterizations of all the words in a record can be included in a label. For example, a label is a tag sequence.

The log-linear model (e.g., CRF) takes as input a weighted set of feature functions, which are arbitrarily complex patterns on its input. The values returned by the weighted feature functions when executed on a candidate label for the input record is normalized to obtain a probability distribution on the tag sequences comprising a label. The labeling procedure can be a supervised learning algorithm consisting of a training phase and an inference phase, as described in FIGS. 1 and 2. For example, the training phase is run on pre-labeled data. The output of the training phase is a set of weights for the defined feature functions. The weights are real numbers and can be negative, zero, or positive. The learned weights are then used in an inference phase to identify a label or tag sequence that maximizes the probability of occurrence of the string under test.

FIG. 3 illustrates an example pseudocode 300 of a statically defined feature function, according to certain aspects of the disclosure. The example pseudocode 300 can be for a statically defined feature function for an example sensitive type "CreditCardNumber" (CCN). According to an aspect, an input tag is checked for a current input word. If the input tag is not a CCN then a 0 is returned. If the input tag is a CCN, then the word is checked for a match with a regex for the CCN type. For example, a regex is a "regular expression," such as a sequence of characters that define a search pattern. If there is no match a 0 is returned. If there is a match the Luhn's condition (e.g., Luhn algorithm) is checked. If the condition fails, a 0 is returned. If the condition passes, then it is checked if, in a window (e.g., four words from the current word), a word indicative of or corresponding to a CCN occurs in the input. This is an example of an encoded pattern. If there is such a word, then a 1 is returned. Otherwise, a 0 is returned.

Sensitive types can often co-occur with identifying words in the context of the sensitive type. In the above example, a statically defined feature function was described that captures such patterns for learning via the weights of the corresponding feature functions. Such feature functions can also be defined dynamically during the training phase of FIG. 1. For example, two passes are made over the training set. One set of passes is for creating the dynamic feature functions, and a second set of passes is for learning the weights of the feature functions. The weights of both the statically and dynamically created feature functions are learned during the second set of passes. Constructors of the feature functions can be defined to take as parameters a context word and a sensitive type. Thus, there is only one feature function class for all sensitive types and the co-occurrence of all the words found in the training set. During the first pass, multiple instances of a class can be generated, for example, one for each combination of sensitive types and context words of interest.

During subsequent passes of the training set, the weights for these dynamically generated feature functions, along with the statically defined ones, are learned. This is a way of automatically learning the context words of the sensitive types without having to code them into the feature functions explicitly beforehand.

FIG. 4 illustrates an example pseudocode 400 of a dynamically generated feature function, according to certain aspects of the disclosure. The example pseudocode 400 can be for a dynamically generated feature function for "SSN." A constructor can take as parameters context words and a desired context window. A tag for a current word is checked to see if it is a SSN. If not, a 0 is returned. If yes, it is checked whether the current word matches a regex for a SSN. If not, a 0 is returned. If yes, it is checked to see if within a context window parameter (e.g., within four words), any of the desired context words appear in the input string. If not, a 0 is returned. If a match occurs, then a 1 is returned.

According to an aspect, instead of checking for any of the words in the context words parameter, it can alternatively be checked to see if all the words in the context words parameter appear. If the sensitive type is partly defined by a regex, then the dynamically generated feature functions can take a regex pattern as one of the parameters to the constructor along with the sensitive type. Then, initially in the function, checks are made to see if the sensitive type matches the tag, and whether the word matches the regex pattern passed with the parameters.

The above-described systems can utilize both a unigram model of the context words, or can be defined dynamically for n-gram models. For example, the occurrence of a combination of words is checked for within a context window. Using such n-gram feature functions, discriminants such as "social", "security", and/or "number" for the SSN sensitive type can be automatically learned.

Sometimes it is more efficient to specify a small number of negative contexts rather than specify a large number of positive contexts. For example, a word can be identified that indicates that the sensitive type is not an SSN (e.g., a negative correlation). Negative contexts can be learned by returning a negative number from a feature function if the conditions for the negative contexts are satisfied.

The dynamically generated feature functions can also be configured to capture an offset of context words from a word under test. These feature functions fire only if the offset at which the context words in the feature function occur in the test input matches the ones found from the training set. This provides a more stringent and detailed learning result from the training set than results without the offset. Using offsets allows correctly identifying co-occurring sensitive types with ambiguity in cases in which there are discriminants for each at different offsets, which is plausible in both structured and unstructured data.

Often there is ambiguity with respect to a regex pattern in the data. For example, both an ABA routing number and a social security number are nine digit numbers. Such ambiguity can be resolved by using a dynamic feature function that takes sensitive types and the context words as constructor parameters. Then, in the body of the feature function the obtained sensitive type is matched with the sensitive type from data (e.g., a training phase) or trial sensitive type (e.g., an inference phase). If a match occurs, the presence of the appropriate context words, with which the instance of the feature function object was constructed, is checked in the input string. Thus, only one of the two (e.g., in the case of a two way ambiguity) feature functions will fire (e.g., return a positive value), for which the context function discriminates the correct sensitive type.

Even if a the training file marks all nine digit numbers with only one label, say NINEDIGITNUMBER, in the event that there is a clear discriminant in the context, two separate feature functions can be dynamically generated for each with a serial discriminant index also passed as a parameter to the constructor. During inference, this discriminant is concatenated to the sensitive type and these concatenated sensitive types are added to the list of tags. This can lead to an automatic grouping of the two classes of nine digit numbers as NINEDIGITNUMBER0 and NINEDIGITNUMBER1.

It is understood that all of the above-described features can be combined for expressively rich patterns that can be learned automatically from the training set.

Example System for Identifying Discriminants for Classifying Sensitive Information Discriminant words for a sensitive type are those words in the context of the sensitive type whose occurrence is strongly correlated to the occurrence of the sensitive type. Discriminant words can occur alone as single words or they can be a combination of words. Syntagmatically related words are those words whose occurrence makes it easy to predict the occurrence of the related words. In other words, syntagmatically related words serve as discriminants to each other. Syntagmatically related words reduce the entropy of the word so related. It is understood that syntagmatically related words includes words that are either order dependent or order independent. Syntagmatically related words may also be next to each other without gaps or may be proximate to each other with gaps.

Entropy is a measure of randomness of a random variable. Each word is characterized by a binary random variable with 1 corresponding to the occurrence of the word in context and 0 corresponding to the absence of the word. High entropy words are harder to predict. Entropy reaches a maximum when the occurrence of a word is purely random, for example, when the random variable takes a value of 0.5.

Entropy is defined as in Equation (1):

$$H(X_w) = \Sigma_{v \in \{0,1\}} - P(X_w = v) \log_2 P(X_w = v) \quad (1)$$

where, $P(X_w = v)$ is the probability of the random variable taking on a value v.

Zero (0) corresponds to the absence of the word in context and one (1) corresponds to the presence of words in context.

Conditional entropy measures the entropy of one word conditional to the presence/absence of another. Entropy of w1 given presence of w2 is defined as in Equation (2):

$$H(Xw1|Xw2=1) = -P(Xw1=0|Xw2=1)\log 2P(Xw1=0|Xw2=1) - P(Xw1=1|Xw2=1)\log 2P(Xw1=1|Xw2=1) \quad (2)$$

Mutual information (MI) is a measure of how much the presence of a word decreases, and makes it easier predict the entropy (e.g., occurrence) of another word.

Mutual Information can be expressed as in Equation (3):

$$I(X;Y) = H(X) - H(X|Y) \quad (3)$$

Mutual information therefore measures the strength of a syntagmatic relationship between a pair of words. It is understood that the syntagmatic relationship includes words that are either order dependent or order independent. The syntagmatic relationship may also include words that are next to each other without gaps or words that are proximate to each other with gaps.

In an implementation, instead of calculating the mutual information between two words in the input data, the example mutual information algorithm is modified to yield the mutual information values between a word in the input file and the sensitive type of a word. The words with high mutual information with a given sensitive type form good discriminants of the sensitive type and can be used to detect that sensitive types by any algorithm that works based on the discriminant words to detect a sensitive type.

Time complexity of mutual information calculation is the sum of lengths of all the context units. Calculating mutual information of all pairs of words results in a quadratic complexity on the number of the words. For sensitive type detection it is possible to reduce the time complexity by calculating mutual information only between pairs of words where one word is a sensitive type.

A topic mining algorithm, such as Probabilistic Latent Semantic analysis (PLSA) can be utilized to improve results. PLSA is a statistical model that utilizes a unigram language model. For example, PLSA assumes that every word is generated independently of the other. PLSA is an extension of the Expectation Maximization approach for calculating probability distribution of words for multiple topics. In an expectation step, the probability of a word arising from a topic (e.g., a probability of the topic given the word) is calculated assuming initial probabilities in topic word distribution and background word distribution. Using these probabilities, a soft split on the count of the words across the topics is calculated in the maximization step. This gives the probability of a word given the topic. Iteratively performing the expectation maximization sets results in a final word distribution for the topic. For example, a topic can include a probability distribution of words in the topic. The topic distribution of words can be utilized for learning contexts for sensitive type detection.

An example method involves considering a context window around every word that satisfies a regex pattern defined for a sensitive type. The words in such context are collected together and a topic mining algorithm, for example PLSA, is run on the words to determine the topics. Therefore, the labels in the training data are used to group topics, though the topic mining algorithm itself is an unsupervised algorithm. The mined topics can be used to prune the number of candidate discriminants for a given sensitive type. Then, the mutual information is applied only on this candidate set of discriminants, thus increasing the performance of the method.

The mined topics can also be used to automatically group sensitive types based on the topics generated. For example, if in the training set the labels identify all nine digit numbers (e.g., SSN and ABA) as only NINEDIGITNUMBER, mining the topics around the labeled words can group the NINEDIGITNUMBER to two groups, each with its own discriminant. This information can be input into numerous algorithms that use discriminants to classify the sensitive types. As a result, the topic mining algorithm can be a semi-supervised algorithm in that the labels do not completely identify the sensitive types.

Yet another utility of topic mining is that a user can be presented with the mined topic words and can then remediate them by placing the words which the user thinks are less relevant for the sensitive type in a list of stop words so that during the subsequent runs these are skipped in the topic mining algorithm. Thus, without needing any code changes the system permits user remediation on site. The pruned high mutual information topic words can be used as unigrams, or a combination of them can also be used as n-grams to form more complex discrimination criteria for inference applications of the algorithm.

Figure 5:
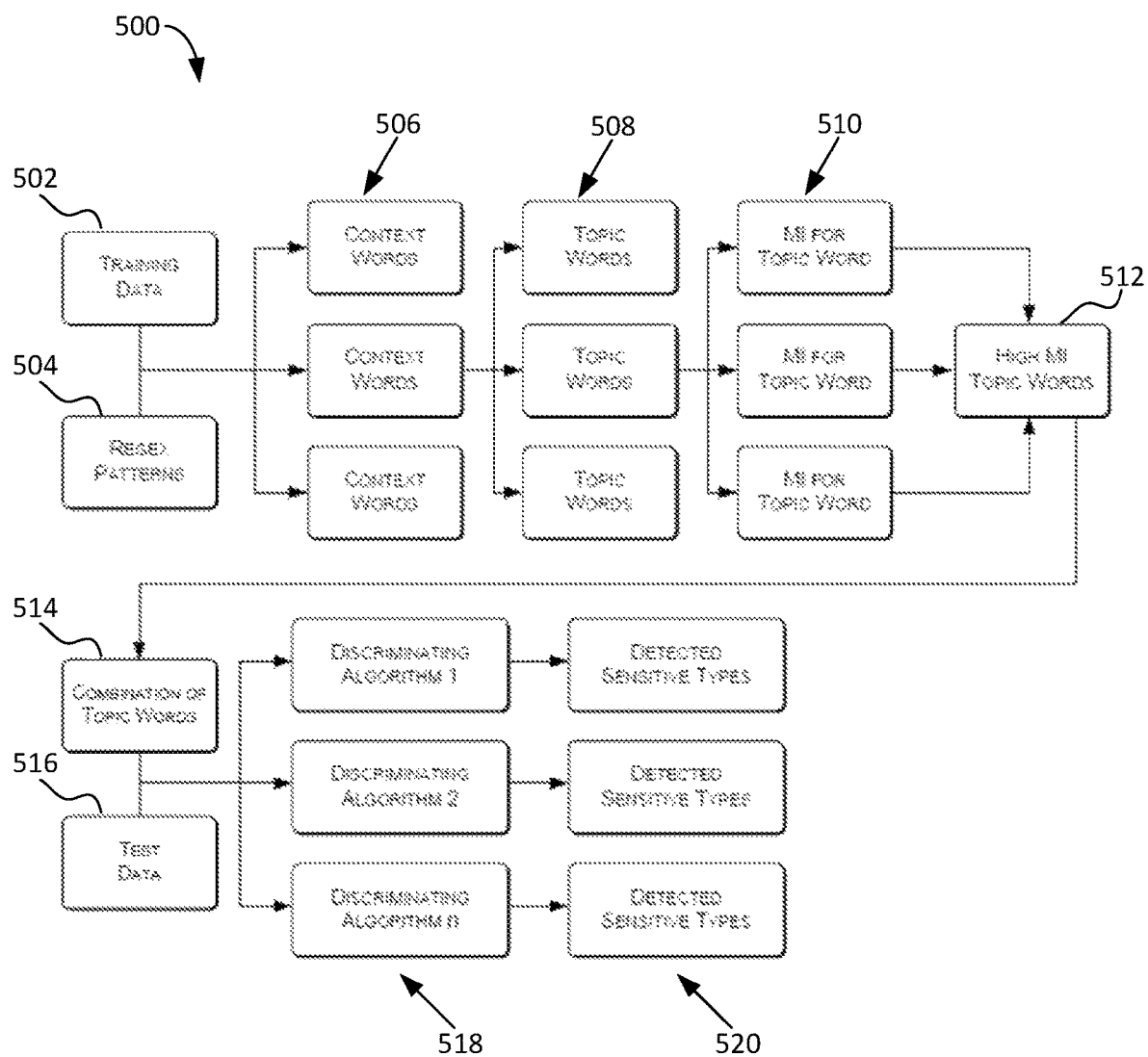
FIG. 5 illustrates an example system for finding discriminants for classifying sensitive types, according to certain aspects of the disclosure.

FIG. 5 illustrates an example system 500 for finding discriminants for classifying sensitive types, according to certain aspects of the disclosure. According to an aspect, training data 502 including sensitive types and regex patterns 504 (e.g., regex patterns for the sensitive types) are utilized together to obtain a set of context words 506 for each sensitive type. For example, the context words 506 are identified based on labeled data (e.g., training data 502) and pre-defined regular expression patterns for sensitive information (e.g., regex patterns 504). The context words 506 for each sensitive type are input into a topic mining algorithm, such as PLSA, to determine a set of topic words 508 for each topic mined along with their probability values. For example, the topic words 508 and probability values of the topic words 508 are determined by processing the context words 506 through a topic mining algorithm.

According to an aspect, the training data 502 and the set of topic words 508 for each topic are utilized to calculate a set of mutual information 510. For example, mutual information values are calculated between the sensitive information (e.g., the training data 502) and the topic words 508. The set of mutual information (MI) 510 can include the corresponding sensitive type for each word in each topic. A statistical measure such as Z values can be utilized to select highest MI value topic words 512. For example, topic words with a highest mutual information value are selected. This results in a pruned list of topic words 514. Optionally, a preprocessing step can form combinations of the pruned topic words 514. For example, discriminants can be identified based on the selected highest MI values.

Test data 516 along with the discovered discriminants (e.g., the combination of topic words 514), are input into a set of discriminating algorithms 518 for sensitive type detection, which results in a set of detected sensitive types 520 (e.g., a final list). According to an aspect, the detected sensitive information can be classified based on the discovered discriminants.

According to aspects of the present disclosure, a CRF is an example algorithm that is applied for sensitive type detection. Based on the context word discriminants, the CRF can utilize a set of dynamically generated feature functions whose constructor takes the context words and the context window as a parameter. For example, the context words parameter can include the discriminants identified using topic mining and mutual information. A pseudocode 400 of a dynamically generated feature function for a SSN was described above in FIG. 4.

At times there is ambiguity between sensitive types. For example, both SSN and ABA routing number are nine digit numbers. Using a strong discriminant such as the one identified by using topic mining and mutual information to classify a nine digit number, for example, makes it easier to disambiguate the sensitive type based on a probabilistic measure of the context. Additional criteria such as combination of words and offsets from the candidate sensitive types can be factored into the algorithm by preprocessing the set of pruned discriminants.

Systems for detecting sensitive types in enterprise data with improved performance and accuracy include a processor, a memory, and a facility to mark-up sensitive data for the training phase of the supervised learning based machine learning module. The system also includes a module to read in the marked-up data and extract the context of each sensitive type separately. The system also includes a module to calculate the strength of a discriminant using a correlation detection algorithm. For example, the correlation detection algorithm can include PLSA and/or NICoMiner. The system also includes a module to further prune the discriminants by calculating mutual information (MI) of the context words selected against the sensitive type. The system also includes a module to use these pruned discriminants either separately or as a Boolean combination inside a dynamically generated feature function. The system also includes a module to feed in such configured feature function into an algorithm to do prediction and one that uses feature functions. The system also includes a module that trains the data with a feature function to identify the weights using the selected algorithm. For example, algorithms that utilize the feature function can be a CRF and/or struct-SVM. The system also includes a module to perform inference based on the dynamically configured feature functions. The system can optionally perform the inference along with a set of statically configured feature functions. The system also includes a module to bring together elemental tag labels from the inference algorithm to form higher-level sensitive type for final sensitive type detection in the enterprise data. The system also includes display hardware for displaying the sensitive data types or the sensitive data to a user.

According to aspects, the sensitive data can be marked-up, such that all the words are labeled with tags denoting the sensitive type and words which are background words. A subset of the context words can be identified that are correlated with the sensitive type under test. Anomalously high correlated data can be chosen as discriminants. Pruned discriminants can be input into a dynamically generated feature function set. The dynamically configured feature functions, along with an optional statically configured feature function set, can be utilized in a detection algorithm, such as CRF and/or struct-SVM. The pruned discriminants can be included as vocabulary words in a vocabulary based algorithm, such as Bidirectional Recurrent Neural Networks (BRNNs) based on long short-term memory (LSTM) cells.

Methods to prune discriminants for identification of sensitive data, the results of which are used in an appropriate algorithm to detect sensitive types, include reading in marked-up data to a computer system including a processor, and labeling each word in the record by the appropriate sensitive type or background label. The method also includes extracting a context of each sensitive type with an optionally configured context window, with a default being the entire record. The method also includes identifying strongly correlated discriminants using algorithms such as Probabilistic Latent Semantic Analysis (PLSA), Latent Dirichlet Allocation (LDA), and/or Null Invariant Correlation Miner (NICoMiner). The method also includes pruning discriminants using mutual information (MI). The method also includes selecting discriminants based on anomalously high correlation strength. The method also includes displaying the sensitive type on a display hardware, or updating data stored in a tangible nonvolatile storage medium of the computer with the sensitive type. The method also includes displaying the pruned discriminants on a display hardware for a user to remediate via user interface hardware.

According to aspects, the pruned discriminants can be utilized as an input to dynamically generated feature functions thereby improving performance and accuracy in a feature function based prediction algorithm, such as Conditional Random Fields (CRFs) and/or struct-SVM. The pruned discriminants can also be included as input into a vocabulary based algorithm such as Bidirectional Recurrent Neural Network based on Long Short-Term Memory cells (e.g., LSTM based BRNNs). During a training phase, the LSTM based BRNNS can be configured to test for a match of sensitive types. If the test indicates a mismatch, the algorithm can loop on the same mismatched data up to a predetermined number of times to get the sensitive type detection to match. An appropriate algorithm can be utilized with pruned discriminants to perform labeling of sensitive types in the enterprise data. Optionally n-grams of the discriminants are grouped before being input into dynamically configured feature functions. A user can optionally remediate to choose a subset of the above identified discriminants. Detected labels can be accumulated to create higher-level labels of interest to a user.

Figure 6:
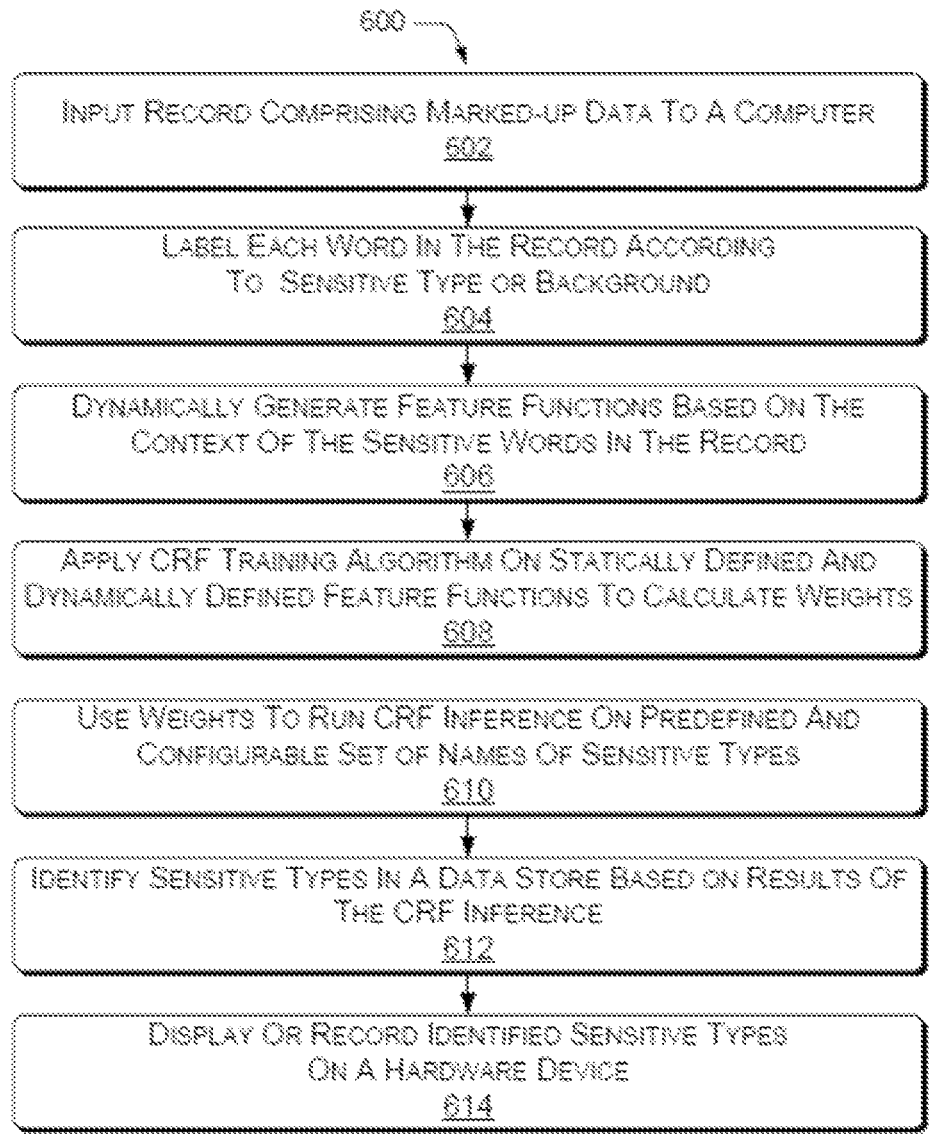
FIG. 6 illustrates an example process for identifying sensitive information, according to certain aspects of the disclosure.

FIG. 6 illustrates an example process 600 for identifying sensitive information, according to certain aspects of the disclosure. For explanatory purposes, the example process 600 is described herein with reference to the training phase system 100 of FIG. 1 and the inference phase system 200 of FIG. 2. Further for explanatory purposes, the blocks of the example process 600 are described herein as occurring in serial, or linearly. However, multiple blocks of the example process 600 may occur in parallel. In addition, the blocks of the example process 600 need not be performed in the order shown, and/or one or more of the blocks of the example process 600 need not be performed. For purposes of explanation of the subject technology, the process 600 will be discussed in reference to FIGS. 1 and 2.

At block 602, a record including marked-up data is input into a computer. At block 604, each word in the record is labeled as a sensitive type or background. At block 606, feature functions are dynamically generated based on the context of the sensitive words in the record. At block 608, a CRF training algorithm is applied on statically defined and dynamically defined feature functions to calculate weights. At block 610, the weights are used to execute CRF inference on a predefined and configurable set of names of sensitive types. At block 612, sensitive types are identified in a data store based on results of the CRF inference. At block 614, identified sensitive type are displayed and/or recorded on a hardware device.

Figure 7:
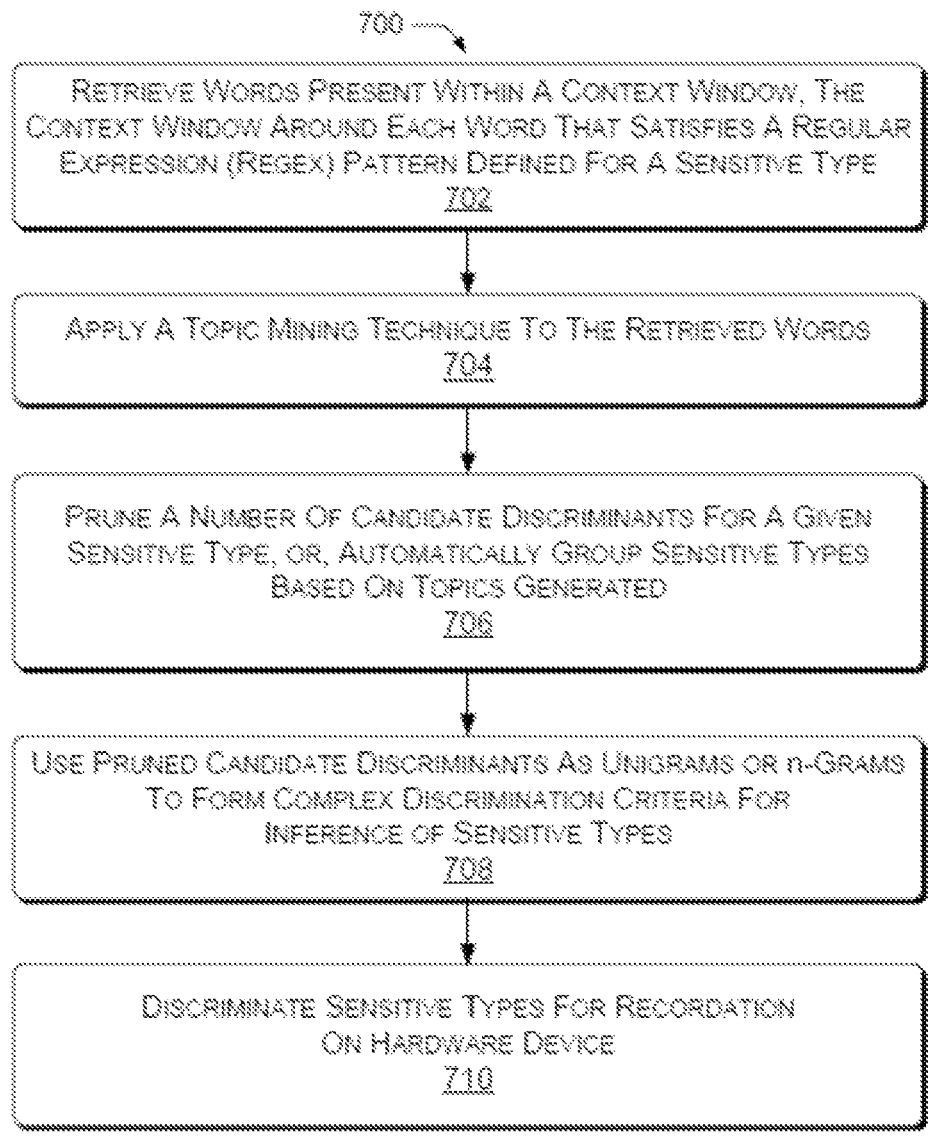
FIG. 7 illustrates an example process for finding discriminants, according to certain aspects of the disclosure.

FIG. 7 shows an example process 700 for finding discriminants, according to certain aspects of the disclosure. For explanatory purposes, the example process 700 is described herein with reference to the system 500 of FIG. 5. Further, for explanatory purposes, the blocks of the example process 700 are described herein as occurring in serial, or linearly. However, multiple blocks of the example process 700 may occur in parallel. In addition, the blocks of the example process 700 need not be performed in the order shown, and/or one or more of the blocks of the example process 700 need not be performed. For purposes of explanation of the subject technology, the process 700 will be discussed in reference to FIG. 5.

At block 702, words present within a context window are retrieved. For example, the context window around each word satisfies a regular expression (regex) pattern defined for a sensitive type. At block 704, a topic mining algorithm is applied to the retrieved words. At block 706, a number of candidate discriminants is pruned for a given sensitive type. According to an aspect, sensitive types can be automatically grouped based on topics generated. At block 708, the pruned candidate discriminants are utilized as unigrams or n-grams to form complex discrimination criteria for inference of sensitive types. At block 710, discriminate sensitive types are recorded on a hardware device.

Figure 8:
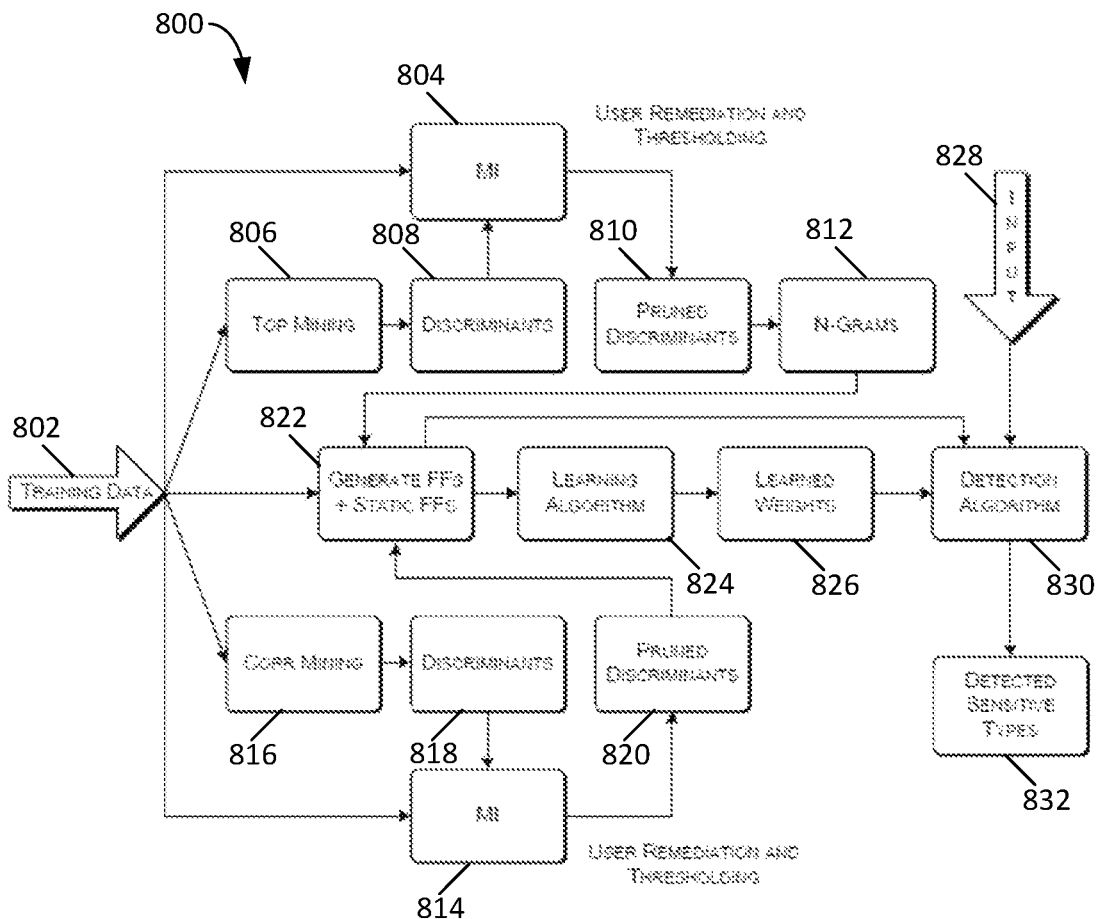
FIG. 8 illustrates an example system for identifying sensitive information, according to certain aspects of the disclosure.

FIG. 8 illustrates an example system 800 for identifying sensitive information, according to certain aspects of the disclosure. The system 800 receives training data 802 (e.g., labeled data), and the training data 802 is input into a topic mining algorithm 806 to determine discriminants 808. The discriminants 808 and the training data 802 are input into a mutual information algorithm 804 to determine a list of pruned discriminants 810. For example, the pruned discriminants 810 can be determined through user remediation and thresholding. The pruned discriminants 810 are formed into n-grams 812 to generate static and dynamic feature functions 822.

The training data 802 can also be input into a correlation mining algorithm 816 to determine discriminants 818. The training data 802 and the discriminants 818 are input into a mutual information algorithm 814 to determine pruned discriminants 820. For example, the pruned discriminants 820 can be determined through user remediation and thresholding. The pruned discriminants 820 are utilized to generate static and dynamic feature functions 822.

The static and dynamic feature functions 822 receive the training data 802 as input, and through a learning algorithm 824, weights 826 are learned for the feature functions 822. Input 828 (e.g., test data) is input into a detection algorithm 830 along with the weights 826 and the feature functions 822 to determine a list of detected sensitive types 832.

FIG. 9 illustrates an example user interface 900, according to certain aspects of the disclosure. The example interface 900 can include configurable parameters such as training/inference file locations, discriminant related parameters, and support custom validations.

According to an aspect, a user can designate a training file location, limit a number of training records, designate a training output parameters location, run an inference from a file, designate an inference input file location, designate an inference output file location, and designate a feature function location.

According to additional aspects, a user can choose a discriminant detection mode, choose a discriminant strength threshold, and choose a maximum number of discriminants without a threshold.

FIG. 10 illustrates example training phase output 1000, according to certain aspects of the disclosure. The output 1000 includes correlated words for the sensitive type "CreditCardNumber."

FIG. 11 illustrates an example user interface 1100, according to certain aspects of the disclosure. The example interface 1100 can include configurable parameters for discriminant detection. For example, a user can choose a sensitive type, and can also choose discriminant detection modes, discriminant strength thresholds, and a maximum number of discriminants without a threshold. The user can also choose to add and/or delete sensitive types.

FIG. 12 illustrates example detection output data 1200, according to certain aspects of the disclosure. As illustrated, the context aware results include more positive identifications for type "CreditCardNumber," less false positives for the types "SocialSecurityNumber," and "ABARoutingNumber," as compared to the vanilla detection.

Systems and methods for detecting sensitive information using pattern recognition are provided. In an implementation, the present invention provides a method and system to use contexts of candidate sensitive types as an input and a set of dynamically generated feature functions based on such contexts to automatically learn the context for each sensitive type during a training phase. The contexts or their combinations thereof are used in a set of dynamically generated feature functions whose weights are then learned using the training set. These weights, along with the dynamically generated feature functions, are then used in an inference phase to correctly classify or disambiguate sensitive types in the data. In another implementation, the present invention provides a method and system to apply topic mining and mutual information calculation to identify strong discriminants for the sensitive types. Thus identified, these pruned discriminants can be presented to the user to remediate. The method then provides as input a final set of discriminants, which can then be used by any algorithm that works discriminatively based on the context words to classify the sensitive types correctly or disambiguate between sensitive types, such as social security numbers and ABA routing numbers, for example.

The techniques described herein may be implemented as method(s) that are performed by physical computing device(s), as one or more non-transitory computer-readable storage media storing instructions (e.g., stored sequences of instructions) which, when executed by computing device(s), cause performance of the method(s), or, as physical computing device(s) that are specially configured with a combination of hardware and software that causes performance of the method(s).

Figure 13:
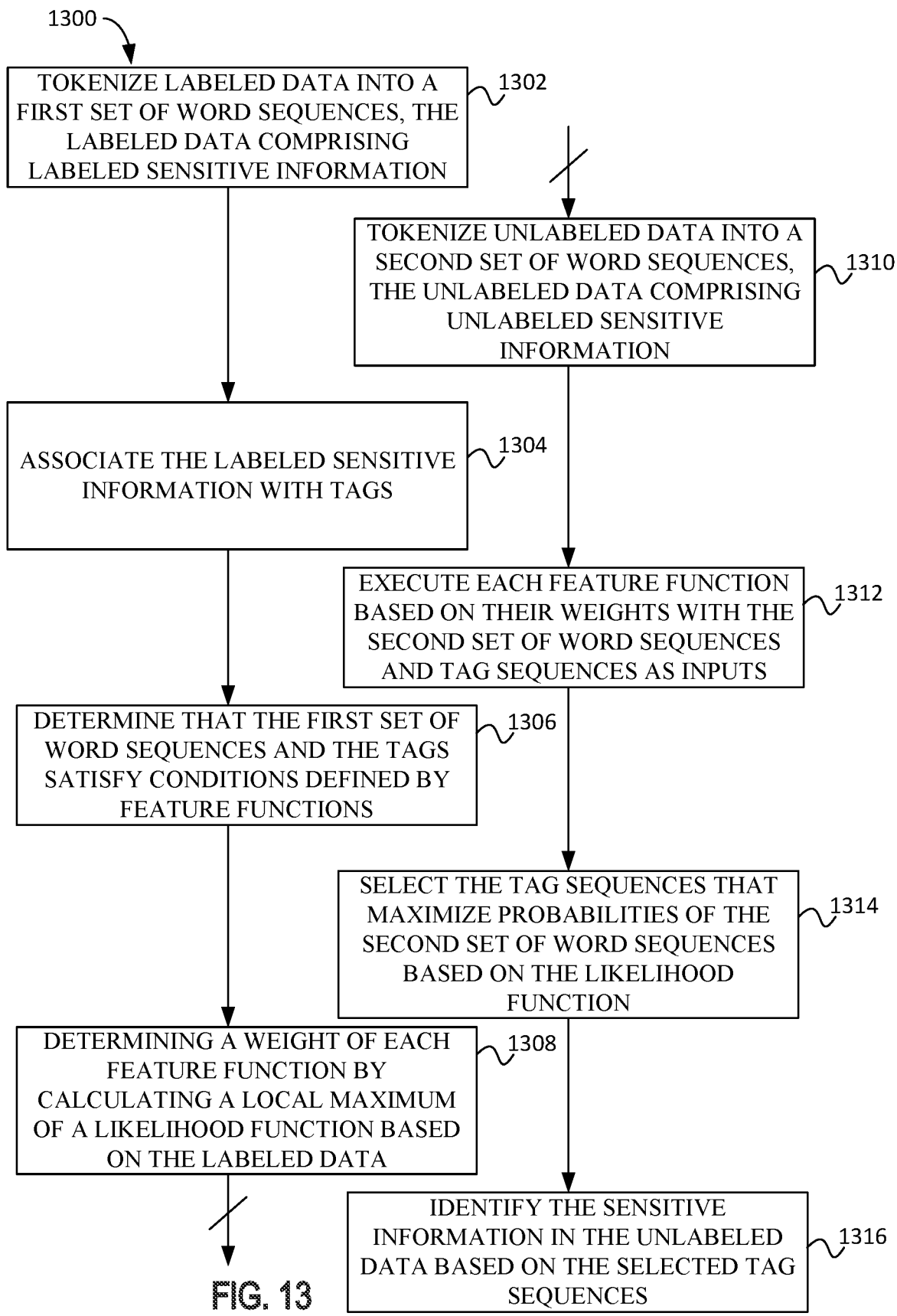
FIG. 13 illustrates an example flow diagram for identifying sensitive information, according to certain aspects of the disclosure.

FIG. 13 illustrates an example process 1300 for identifying sensitive information, according to certain aspects of the disclosure. For explanatory purposes, the example process 1300 is described herein with reference to the training system 100 of FIG. 1, the inference system 200 of FIG. 2, and the system 500 of FIG. 5. Further for explanatory purposes, the blocks of the example process 1300 are described herein as occurring in serial, or linearly. However, multiple blocks of the example process 1300 may occur in parallel. In addition, the blocks of the example process 1300 need not be performed in the order shown, and/or one or more of the blocks of the example process 1300 need not be performed. For purposes of explanation of the subject technology, the process 1300 will be discussed in reference to FIGS. 1, 2, and 5.

At block 1302, labeled data is tokenized into a first set of word sequences, the labeled data including labeled sensitive information. At block 1304, the labeled sensitive information is associated with tags. At block 1306, the first set of word sequences and the tags are determined to satisfy conditions defined by feature functions. At block 1308, a weight of each feature function is determined by calculating a local maximum of a likelihood function based on the labeled data. For example, the likelihood function can utilize a log linear model. The parameters to the likelihood function are the values returned by the feature functions for a given possible tag comprising a label.

At block 1310, unlabeled data is tokenized into a second set of word sequences, the unlabeled data including unlabeled sensitive information. At block 1312, each feature function is executed based on their weights with the second set of word sequences and tag sequences as inputs. At block 1314, the tag sequences are selected that maximize probabilities of the second set of word sequences based on the likelihood function. At block 1316, the sensitive information is identified in the unlabeled data based on the selected tag sequences.

According to an aspect of the present disclosure, the process 1300 further includes defining a set of static feature functions, and defining a set of dynamic feature functions.

According to an aspect of the present disclosure, defining the set of dynamic feature functions includes learning correlations between the first set of word sequences and the tags, and defining a set of conditions based on the learned correlations.

According to an aspect of the present disclosure, the process 1300 further includes generating the labeled data by marking up documents to identify the sensitive information in the documents.

According to an aspect of the present disclosure, the process 1300 further includes identifying context words based on the labeled data and pre-defined regular expression patterns for sensitive information, determining topic words and probability values of the topic words by processing the context words through a topic mining algorithm, calculating mutual information values between the sensitive information and the topic words, selecting topic words with a highest mutual information value, and identifying discriminants based on the selection.

According to an aspect of the present disclosure, the process 1300 further includes classifying the sensitive information based on the discriminants.

According to an aspect of the present disclosure, the process 1300 further can include identifying a negative correlation between the first set of word sequences and the tags.

According to aspects of the present disclosure, a system for detecting sensitive types in enterprise data includes a processor, a memory, and user interface hardware for enabling a user to request the system to find sensitive data types or sensitive data. The system also includes a facility to mark-up sensitive data for the training phase of a supervised learning based machine learning module. The system also includes a module to read in the marked-up data and extract the context of each sensitive type separately. The system also includes a module to automatically and dynamically generate feature functions for each of the sensitive type based on context words and their locations of the sensitive types in the training data. The system also includes a module to calculate the weights of these feature functions based on the training data. The system also includes a facility to read in production data which are not marked up. The system also includes a module to detect sensitive types, both unary and structured, based on the log-linear model and calculated conditional probability of tag sequence given the words in the enterprise data store. The system also includes a display hardware for showing the sensitive data types or the sensitive data to the user.

According to an aspect, the sensitive data is marked-up and all the words are labelled with tags denoting the sensitive type and those words which are background words. Statically defined feature functions are evaluated for each word in the record. A context is used to dynamically generate feature functions. Such context includes words occurring in a configurable pre-defined context window around the sensitive type being examined. A current tag, a previous tag, and the entire record is included as an input into both the dynamically generated and statically defined feature functions. An aggregate feature function value is calculated for the record being examined. A gradient ascent algorithm is used to maximize the log linear conditional probability in order to calculate the coefficients/weights for the feature functions. A configurable set of sensitive type names and their regexes are defined. The statically defined and dynamically defined feature functions and their weights are used to run the CRF inference algorithm to detect from amongst the sensitive types configured earlier. It is understood that the systems described herein can be utilized with any algorithm based on feature functions in addition to CRF, for example, struct-SVM.

According to an aspect, the method also includes displaying the sensitive type on a display hardware or updating data stored in a tangible nonvolatile storage medium of the computer with the sensitive type.

According to aspects of the present disclosure, the sensitive type names and their corresponding regular expressions include instance-to-instance configuration of detected sensitive types. Pre-configured stop words and blacklisted words can be removed from the context. The marked-up record can be examined to determine a context of sensitive types. A set of feature functions can be dynamically created based on the context and the regular expression for the sensitive type. A gradient ascent based CRF training algorithm can calculate the feature function weights. Both statically defined and dynamically defined feature functions can be configured to execute the CRF Inference algorithm to tag, with the sensitive types of the record, sequences of words based on a maximum conditional probability determined by the log linear model. Sensitive types with the same regex patterns can be automatically differentiated. For example, SSN and ABA Routing numbers can be disambiguated based on the values returned by the dynamically configured feature functions. The methods described allow for configuration of arbitrary Boolean expressions against any sensitive type which then is read in and configured during run-time in the dynamically generated feature functions. It is understood that any algorithm can be utilized that is based on feature functions, such as CRM and struct-SVM, which are based on feature functions and the maximum margin principle.

Hardware Overview

Figure 14:
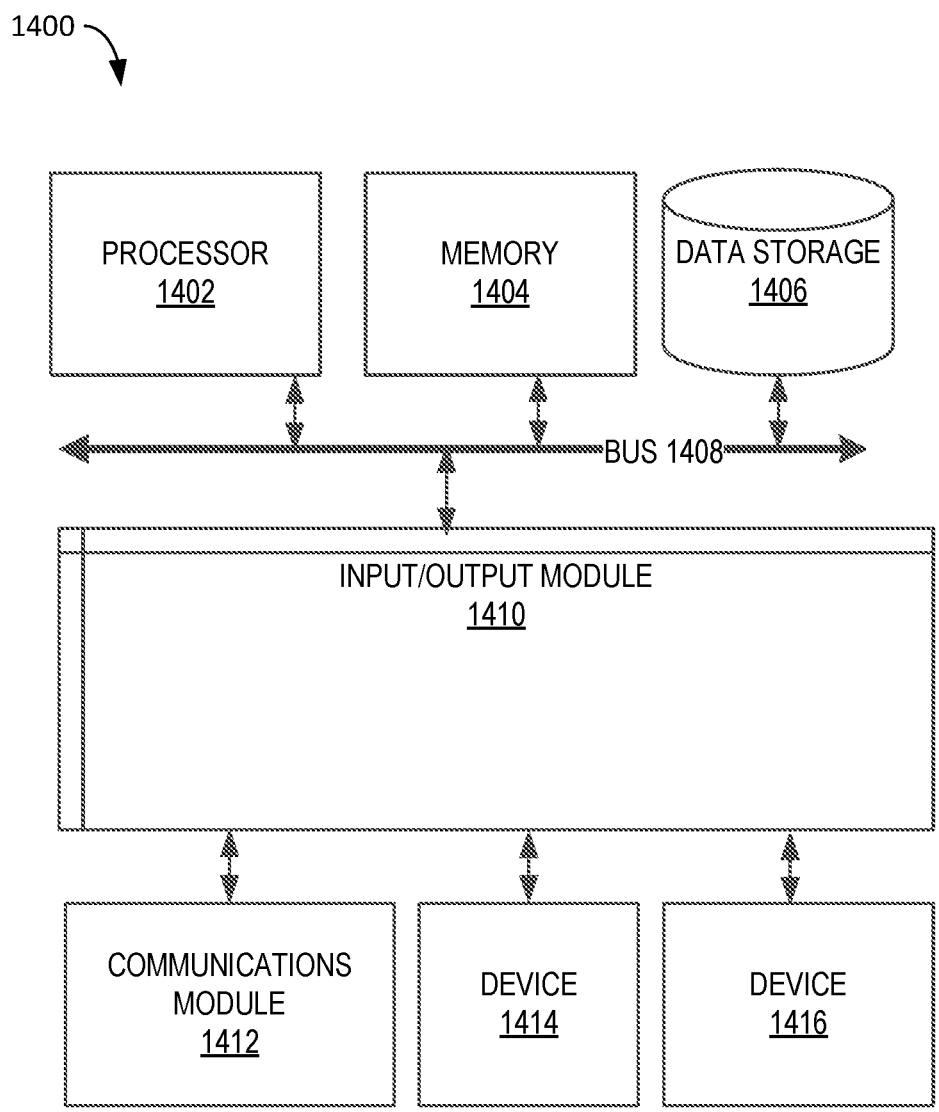
FIG. 14 is a block diagram illustrating an example computer system with which aspects of the subject technology can be implemented.

FIG. 14 is a block diagram illustrating an example computer system 1400 with which aspects of the subject technology can be implemented. In certain aspects, the computer system 1400 may be implemented using hardware or a combination of software and hardware, either in a dedicated server, integrated into another entity, or distributed across multiple entities.

Computer system 1400 (e.g., training system 100, inference system 200, and system 500) includes a bus 1408 or other communication mechanism for communicating information, and a processor 1402 coupled with bus 1408 for processing information. According to one aspect, the computer system 1400 can be a cloud computing server of an IaaS that is able to support PaaS and SaaS services. According to one aspect, the computer system 1400 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques. By way of example, the computer system 1400 may be implemented with one or more processors 1402. Processor 1402 may be a general-purpose microprocessor, a microcontroller, a Digital Signal Processor (DSP), an ASIC, an FPGA, a Programmable Logic Device (PLD), a controller, a state machine, gated logic, discrete hardware components, or any other suitable entity that can perform calculations or other manipulations of information.

Computer system 1400 can include, in addition to hardware, code that creates an execution environment for the computer program in question, such as, for example, code that constitutes processor firmware, a protocol stack, a database management system, an operating system, or a combination of one or more of them stored in an included memory 1404, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1408 for storing information and instructions to be executed by processor 1402. The processor 1402 and the memory 1404 can be supplemented by, or incorporated in, special purpose logic circuitry. Expansion memory may also be provided and connected to computer system 1400 through input/output module 1410, which may include, for example, a SIMM (Single In Line Memory Module) card interface. Such expansion memory may provide extra storage space for computer system 1400, or may also store applications or other information for computer system 1400. Specifically, expansion memory may include instructions to carry out or supplement the processes described above, and may include secure information also. Thus, for example, expansion memory may be provided as a security module for computer system 1400, and may be programmed with instructions that permit secure use of computer system 1400. In addition, secure applications may be provided via the SIMM cards, along with additional information, such as placing identifying information on the SIMM card in a non-hackable manner.

The instructions may be stored in the memory 1404 and implemented in one or more computer program products (e.g., one or more modules of computer program instructions encoded on a computer readable medium for execution by, or to control the operation of, the computer system 1400), and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, with languages, embeddable languages, and xml-based languages. Memory 1404 may also be used for storing temporary variable or other intermediate information during execution of instructions to be executed by processor 1402.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 1400 further includes a data storage device 1406 such as a magnetic disk or optical disk, coupled to bus 1408 for storing information and instructions. Computer system 1400 may be coupled via input/output module 1410 to various devices. The input/output module 1410 can be any input/output module. Example input/output modules 1410 include data ports such as USB ports. In addition, input/output module 1410 may be provided in communication with processor 1402, so as to enable near area communication of computer system 1400 with other devices. The input/output module 1410 may provide, for example, wired communication in some implementations, or wireless communication in other implementations, and multiple interfaces may also be used. The input/output module 1410 is configured to connect to a communications module 1412. Example communications modules 1412 include networking interface cards, such as Ethernet cards and modems.

The components of the system can be interconnected by any form or medium of digital data communication (e.g., a communication network). The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 1412 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time Division Multiple Access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 1412 sends and receives electrical, electromagnetic, or optical signals that carry digital data streams representing various types of information. The network link typically provides data communication through one or more networks to other data devices. For example, the network link of the communications module 1412 may provide a connection through a local network to a host computer or to data equipment operated by an Internet Service Provider (ISP). The ISP in turn provides data communication services through the world wide packet data communication network now commonly referred to as the "Internet." The local network and Internet both use electrical, electromagnetic, or optical signals that carry digital data streams. The signals through the various networks and the signals on the network link and through communications module 1412, which carry the digital data to and from computer system 1400, are example forms of transmission media.

Computer system 1400 can send messages and receive data, including program code, through the network(s), the network link, and communications module 1412. In the Internet example, a server might transmit a requested code for an application program through the Internet, the ISP, the local network, and communications module 1412. The received code may be executed by processor 1402 as it is received, and/or stored in data storage 1406 for later execution.

In certain aspects, the input/output module 1410 is configured to connect to a plurality of devices, such as an input device 1414 and/or an output device 1416. Example input devices 1414 include a keyboard and a pointing device (e.g., a mouse or a trackball) by which a user can provide input to the computer system 1400. Other kinds of input devices 1414 can be used to provide for interaction with a user as well, such as a tactile input device, visual input device, audio input device, or brain-computer interface device. For example, feedback provided to the user can be any form of sensory feedback (e.g., visual feedback, auditory feedback, or tactile feedback, and input from the user can be received in any form, including acoustic, speech, tactile, or brain wave input). Example output devices 1416 include display devices such as an LED (light emitting diode), CRT (cathode ray tube), LCD (liquid crystal display) screen, a TFT LCD (Thin-Film-Transistor Liquid Crystal Display), or an OLED (Organic Light Emitting Diode) display for displaying information to the user. The output device 1416 may comprise appropriate circuitry for driving the output device 1416 to present graphical and other information to a user.

According to one aspect of the present disclosure, the training system 100, the inference system 200, and/or the system 500 can be implemented using a computer system 1400 in response to processor 1402 executing one or more sequences of one or more instructions contained in memory 1404. Such instructions may be read into memory 1404 from another machine-readable medium, such as data storage device 1406. Execution of the sequences of instructions contained in main memory 1404 causes processor 1402 to perform the process steps described herein. One or more processors in a multi-processing arrangement may also be employed to execute the sequences of instructions contained in memory 1404. Processor 1402 may process the executable instructions and/or data structures by remotely accessing the computer program product, for example, by downloading the executable instructions and/or data structures from a remote server through communications module 1412 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed in a cloud-computing environment. Accordingly, in certain aspects, a user of systems and methods as disclosed herein may perform at least some of the steps by accessing a cloud server through a network connection. Further, data files, circuit diagrams, performance specifications and the like, resulting from the disclosure may be stored in a database server in the cloud-computing environment, or may be downloaded to a private storage device from the cloud-computing environment.

Computing system 1400 can include clients and servers. A client and server are generally remote from each other and typically interact through a communication network. The relationship of client and server arises by virtue of computer programs running on the respective computers and having a client-server relationship to each other. Computer system 1400 can be, for example, and without limitation, a desktop computer, laptop computer, or tablet computer. Computer system 1400 can also be embedded in another device, for example, and without limitation, a mobile telephone, a personal digital assistant (PDA), a mobile audio player, a Global Positioning System (GPS) receiver, and/or a television set top box.

The term "machine-readable storage medium" or "computer-readable medium" as used herein refers to any medium or media that is provided including instructions or data to processor 1402 for execution. The term "storage medium" as used herein refers to any non-transitory computer readable storage medium that stores data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory such as data storage device 1406. Volatile media include dynamic memory such as memory 1404. Transmission media include coaxial cables, copper wire, and fiber optics, including the wires that comprise bus 1408. Common forms of machine-readable media include, for example, a floppy disk, a flexible disk, a hard disk, magnetic tape, any other magnetic medium, a CD-ROM, a DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire, and fiber optics, including the wires that comprise bus 1408. Transmission media can also take the form of acoustic or light waves, such as those generated during radio-wave and infra-red data communications. Furthermore, as used in the specification of this application, the terms "computer," "server," "processor," and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first, second, and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately, or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for identifying sensitive information comprising:
   tokenizing labeled data into a first set of word sequences, the labeled data comprising labeled sensitive information;
   associating the labeled sensitive information with tags;
   determining that the first set of word sequences and the tags satisfy conditions defined by feature functions;
   determining a weight of each feature function by calculating a local maximum of a likelihood that the sensitive information is included in the labeled data, the weight comprising a negative value when the conditions defined by the feature functions are not applicable to the labeled data, the weight comprising a positive value when the conditions defined by the feature functions are applicable to the labeled data, and the weight comprising zero when the sensitive information corresponding to the feature function does not appear in the labeled data;
   tokenizing unlabeled data into a second set of word sequences, the unlabeled data comprising unlabeled sensitive information;
   executing each feature function based on their weights with the second set of word sequences and tag sequences as inputs;

selecting the tag sequences that maximize probabilities of occurrence of the second set of word sequences based on the likelihood that the sensitive information is included in the labeled data; and
identifying the sensitive information in the unlabeled data based on the tag sequences that were selected.

2. The computer-implemented method of claim 1, further comprising:
defining a set of static feature functions; and
defining a set of dynamic feature functions.

3. The computer-implemented method of claim 2, wherein defining the set of dynamic feature functions comprises:
learning correlations between the first set of word sequences and the tags; and
defining a set of conditions based on the learned correlations.

4. The computer-implemented method of claim 1, further comprising:
generating the labeled data by marking up documents to identify the sensitive information in the documents.

5. The computer-implemented method of claim 1, further comprising:
identifying context words based on the labeled data and pre-defined regular expression patterns for sensitive information;
determining topic words and probability values of the topic words by processing the context words through a topic mining algorithm;
calculating mutual information values between the sensitive information and the topic words;
selecting topic words with a highest mutual information value; and
identifying discriminants based on the topic words that were selected.

6. The computer-implemented method of claim 5, further comprising:
classifying the sensitive information based on the discriminants.

7. The computer-implemented method of claim 1, further comprising:
identifying a negative correlation between the first set of word sequences and the tags.

8. A system for identifying sensitive information comprising:
a memory storing sequences of instructions; and
a processor comprising at least hardware components for executing the sequences of instructions which, when executed, causes:
tokenizing labeled data into a first set of word sequences, the labeled data comprising labeled sensitive information;
associating the labeled sensitive information with tags;
determining that the first set of word sequences and the tags satisfy conditions defined by feature functions;
determining a weight of each feature function by calculating a local maximum of a likelihood that the sensitive information is included in the labeled data, the weight comprising a negative value when the conditions defined by the feature functions are not applicable to the labeled data, the weight comprising a positive value when the conditions defined by the feature functions are applicable to the labeled data, and the weight comprising zero when the sensitive information corresponding to the feature function does not appear in the labeled data;
tokenizing unlabeled data into a second set of word sequences, the unlabeled data comprising unlabeled sensitive information;
executing each feature function based on their weights with the second set of word sequences and tag sequences as inputs;
selecting the tag sequences that maximize probabilities of occurrence of the second set of word sequences based on the likelihood that the sensitive information is included in the labeled data; and
identifying the sensitive information in the unlabeled data based on the tag sequences that were selected.

9. The system of claim 8, further comprising stored sequences of instructions, which when executed by the processor, cause:
defining a set of static feature functions; and
defining a set of dynamic feature functions.

10. The system of claim 9, wherein defining the set of dynamic feature functions comprises:
learning correlations between the first set of word sequences and the tags; and
defining a set of patterns based on the learned correlations.

11. The system of claim 8, further comprising stored sequences of instructions, which when executed by the processor, cause:
generating the labeled data by marking up documents to identify the sensitive information in the documents.

12. The system of claim 8, further comprising stored sequences of instructions, which when executed by the processor, cause:
identifying context words based on the labeled data and pre-defined regular expression patterns for sensitive information;
determining topic words and probability values of the topic words by processing the context words through a topic mining algorithm;
calculating mutual information values between the sensitive information and the topic words;
selecting topic words with a highest mutual information value; and
identifying discriminants based on the topic words that were selected.

13. The system of claim 12, further comprising stored sequences of instructions, which when executed by the processor, cause:
classifying the sensitive information based on the discriminants.

14. The system of claim 8, further comprising stored sequences of instructions, which when executed by the processor, cause:
identifying a negative correlation between the first set of word sequences and the tags.

15. A non-transitory computer readable medium is provided including instructions that, when executed by a processor, cause the processor to perform operations for identifying sensitive information, the operations comprising:
tokenizing labeled data into a first set of word sequences, the labeled data comprising labeled sensitive information;
associating the labeled sensitive information with tags;
determining that the first set of word sequences and the tags satisfy conditions defined by feature functions;
determining a weight of each feature function by calculating a local maximum of a likelihood that the sensitive information is included in the labeled data, the weight comprising a negative value when the conditions defined by the feature functions are not applicable to the labeled data, the weight comprising a positive value when the conditions defined by the feature functions are applicable to the labeled data, and the weight comprising zero when the sensitive information corresponding to the feature function does not appear in the labeled data;

tokenizing unlabeled data into a second set of word sequences, the unlabeled data comprising unlabeled sensitive information;

executing each feature function based on their weights with the second set of word sequences and tag sequences as inputs;

selecting the tag sequences that maximize probabilities of occurrence of the second set of word sequences based on the likelihood that the sensitive information is included in the labeled data; and identifying the sensitive information in the unlabeled data based on the tag sequences that were selected.

16. The non-transitory computer readable storage medium of claim 15, wherein the operations further comprises:
    defining a set of static feature functions; and
    defining a set of dynamic feature functions.

17. The non-transitory computer readable storage medium of claim 16, wherein the operations further comprises:
    learning correlations between the first set of word sequences and the tags; and
    defining a set of conditions based on the learned correlations.

18. The non-transitory computer readable storage medium of claim 15, wherein the operations further comprises:
    generating the labeled data by marking up documents to identify the sensitive information in the documents.

19. The non-transitory computer readable storage medium of claim 15, wherein the operations further comprises:
    identifying context words based on the labeled data and pre-defined regular expression patterns for sensitive information;
    determining topic words and probability values of the topic words by processing the context words through a topic mining algorithm;
    calculating mutual information values between the sensitive information and the topic words;
    selecting topic words with a highest mutual information value; and
    identifying discriminants based on the topic words that were selected.

20. The non-transitory computer readable storage medium of claim 19, wherein the operations further comprises:
    classifying the sensitive information based on the discriminants.

* * * * *